June 5, 1951     O. H. PEARSON     2,556,147
ROTATABLE BUCK RECIPROCATING HEAD PRESSING MACHINE
Filed April 2, 1945     7 Sheets-Sheet 1
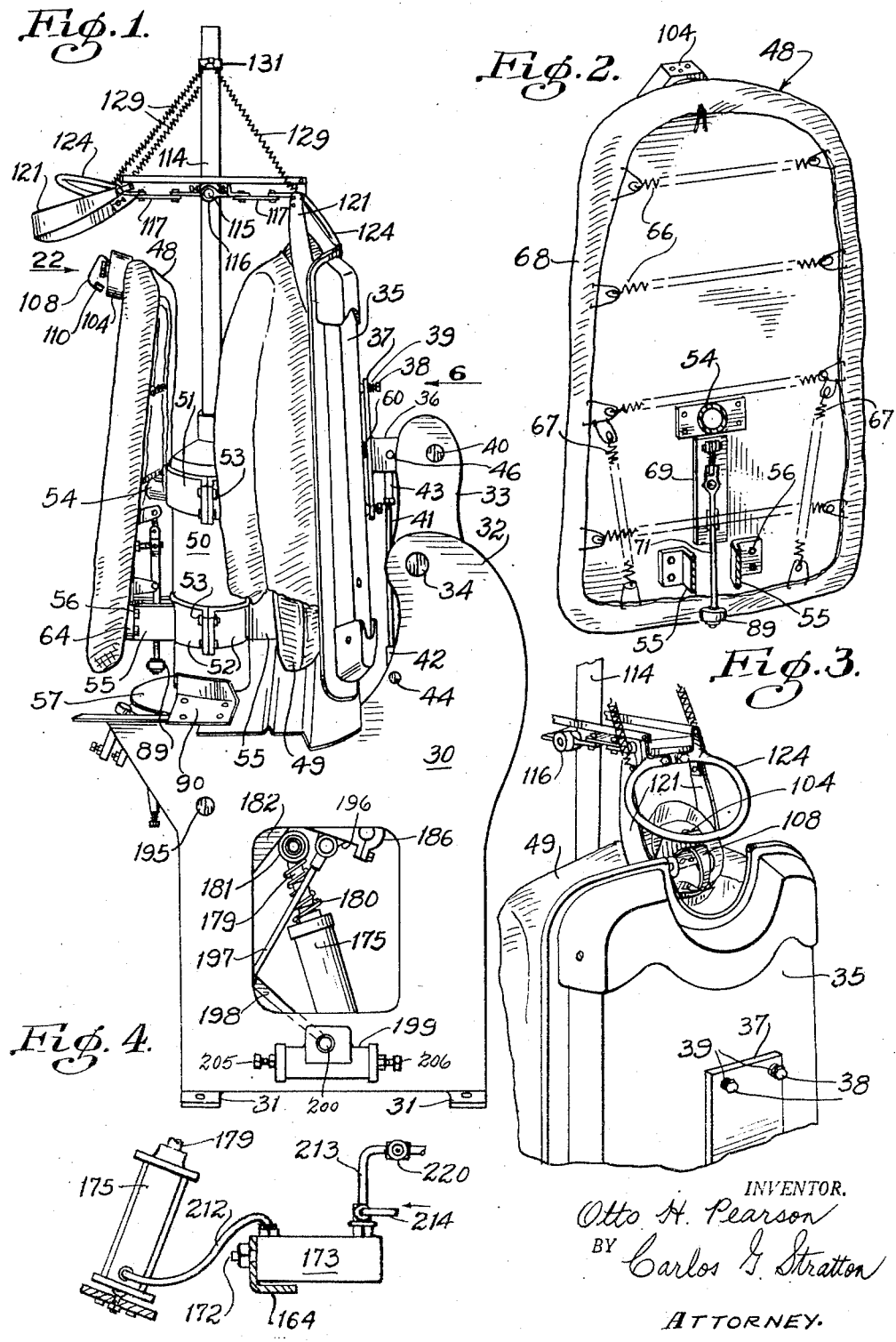

June 5, 1951     O. H. PEARSON     2,556,147
ROTATABLE BUCK RECIPROCATING HEAD PRESSING MACHINE
Filed April 2, 1945     7 Sheets-Sheet 2
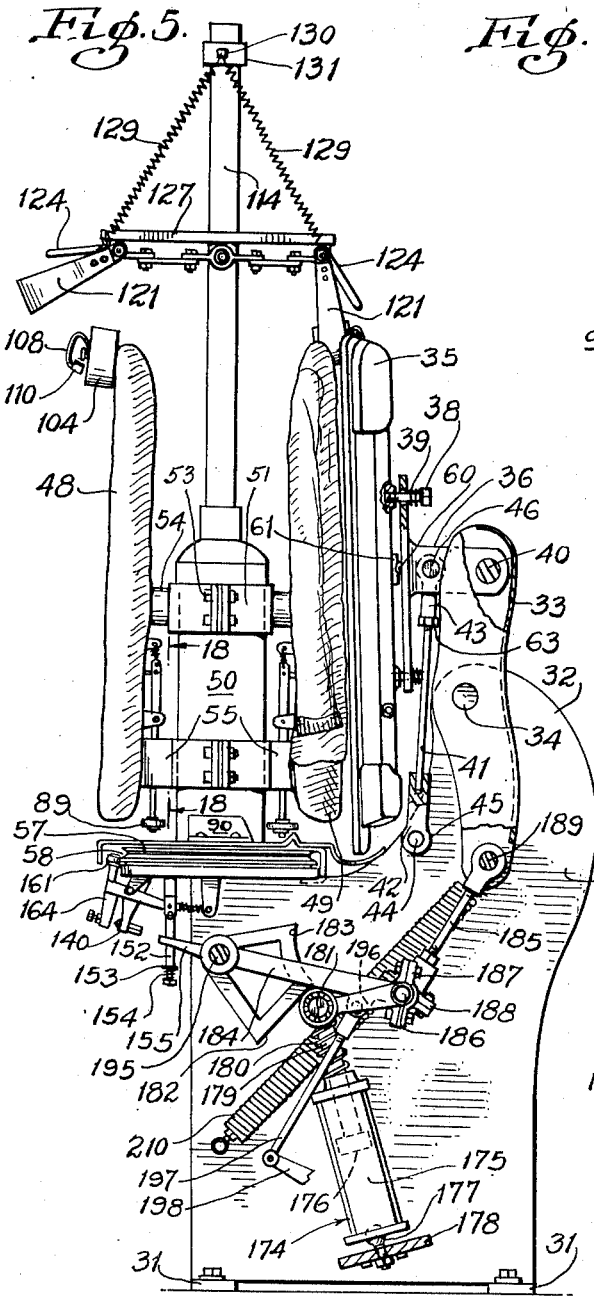
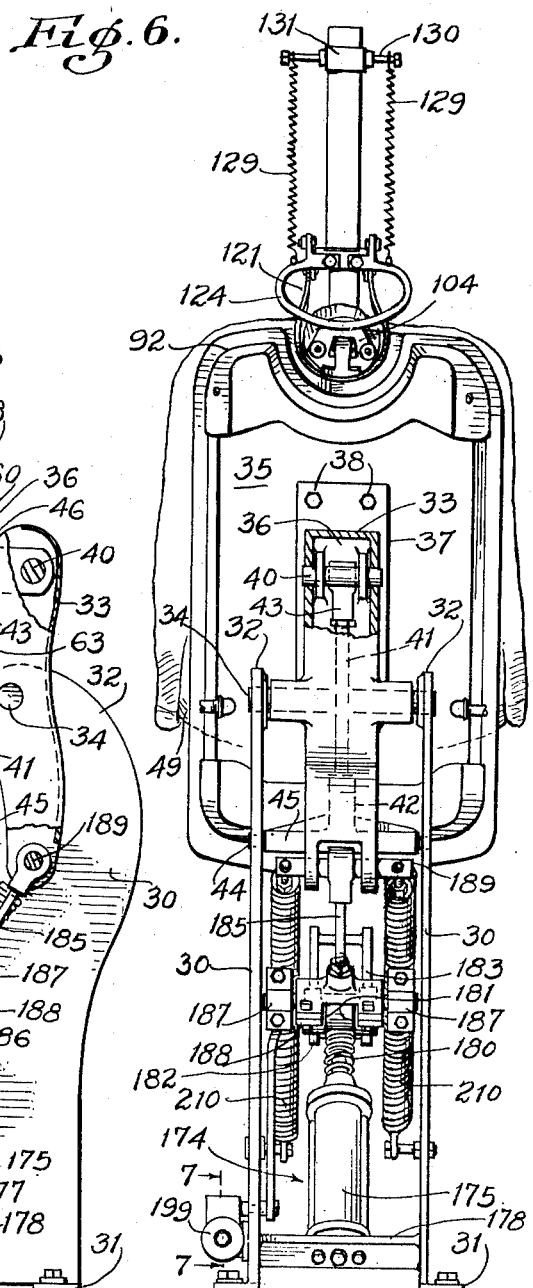
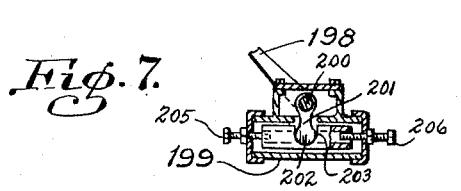
INVENTOR.
Otto H. Pearson
BY Carlos T. Stratton
ATTORNEY.

June 5, 1951          O. H. PEARSON          2,556,147
ROTATABLE BUCK RECIPROCATING HEAD PRESSING MACHINE
Filed April 2, 1945                                           7 Sheets-Sheet 3
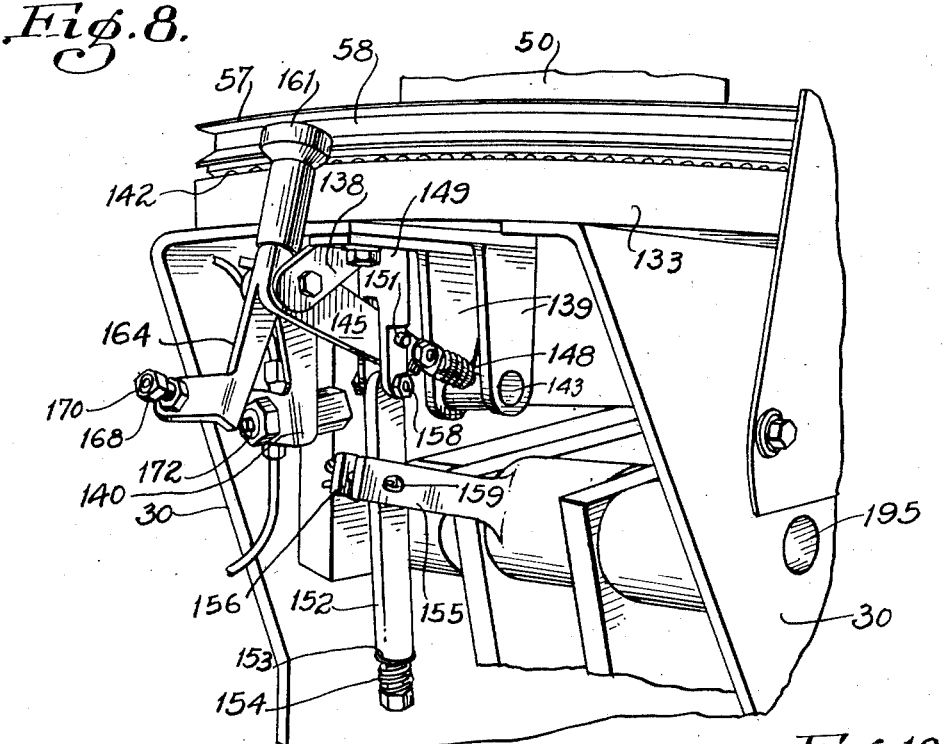
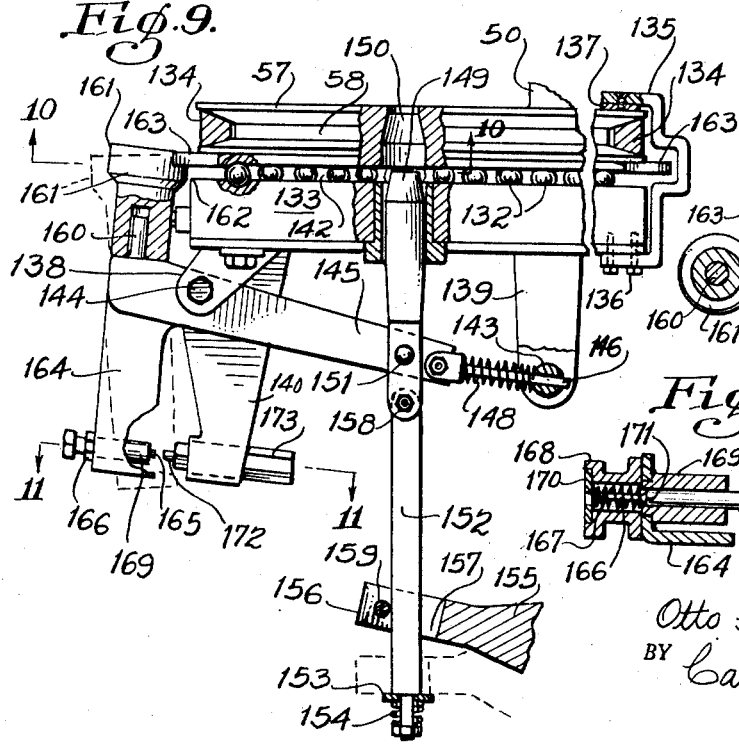
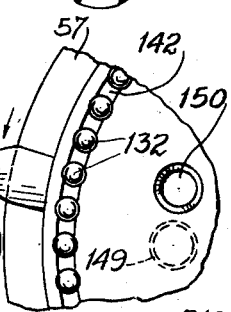
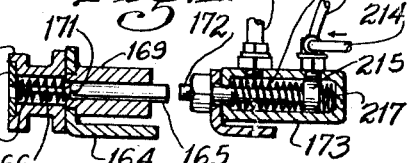
INVENTOR.
Otto H. Pearson
BY Carlos G. Stratton
ATTORNEY.

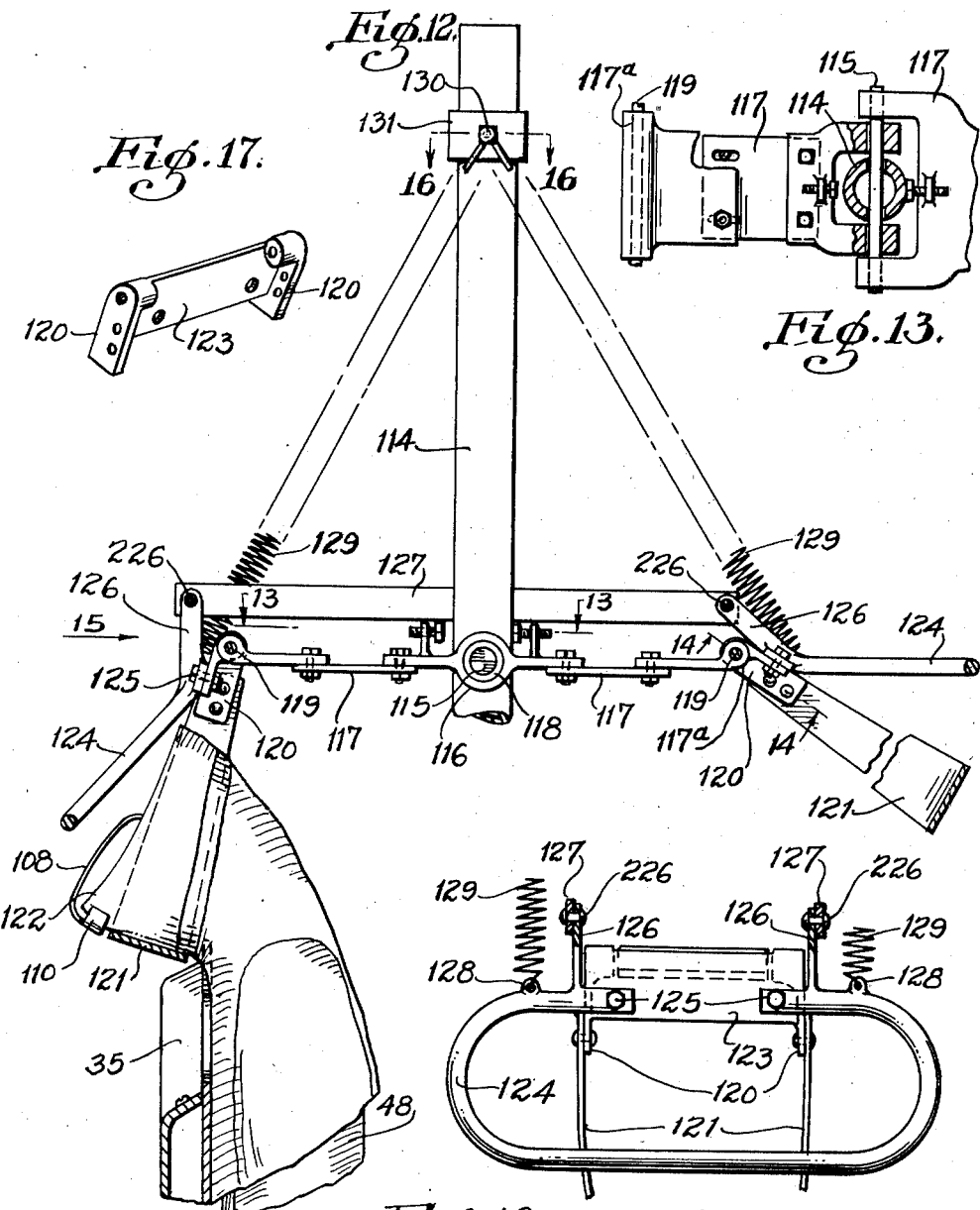

June 5, 1951     O. H. PEARSON     2,556,147
ROTATABLE BUCK RECIPROCATING HEAD PRESSING MACHINE
Filed April 2, 1945     7 Sheets-Sheet 5
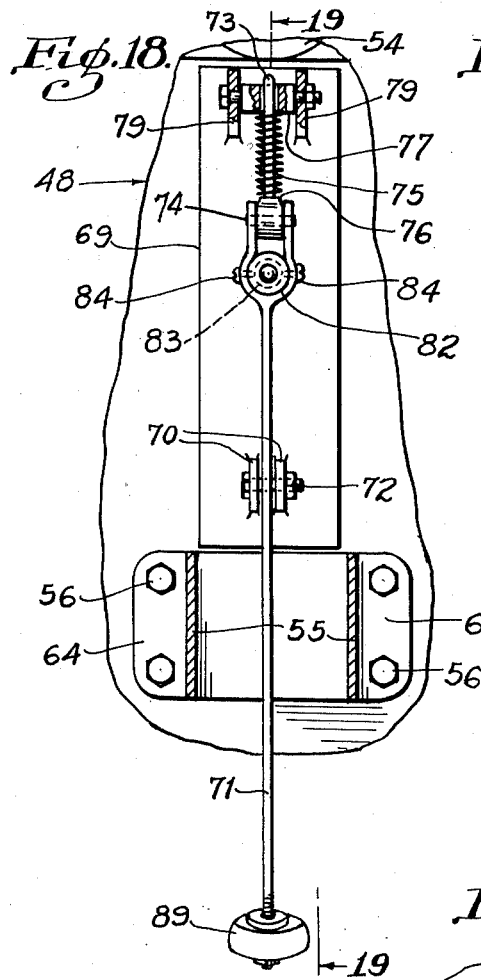
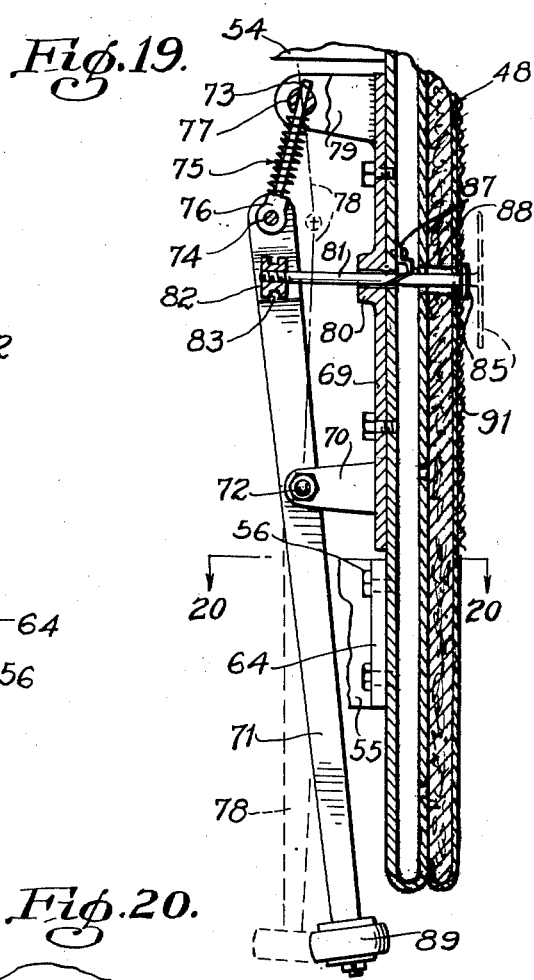
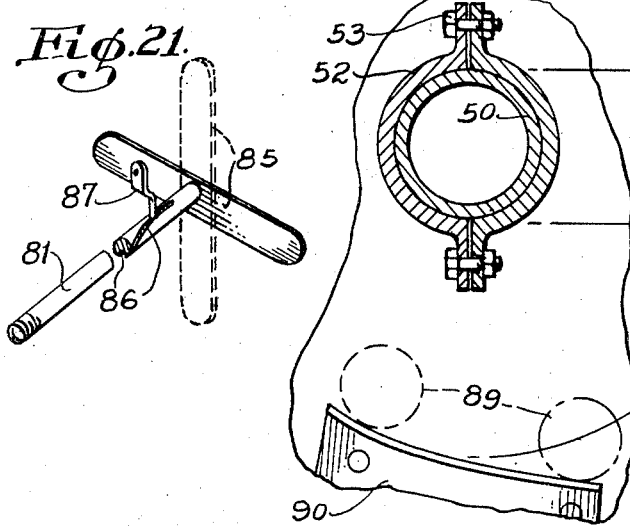
INVENTOR.
Otto H. Pearson
BY Carlos G. Stratton
ATTORNEY.

June 5, 1951     O. H. PEARSON     2,556,147
ROTATABLE BUCK RECIPROCATING HEAD PRESSING MACHINE
Filed April 2, 1945     7 Sheets-Sheet 6
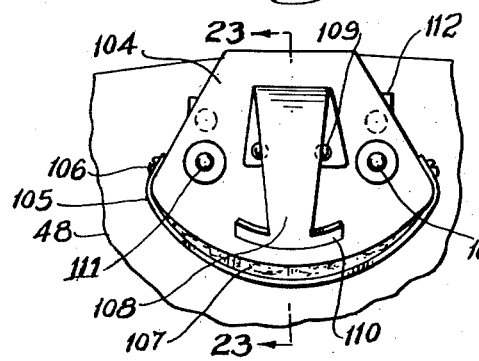
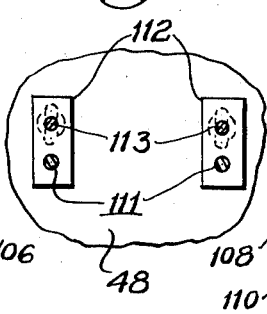
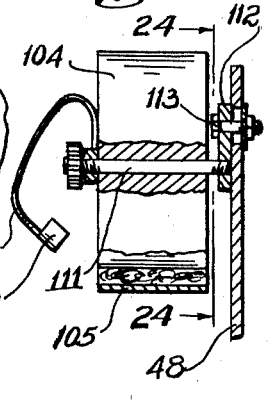
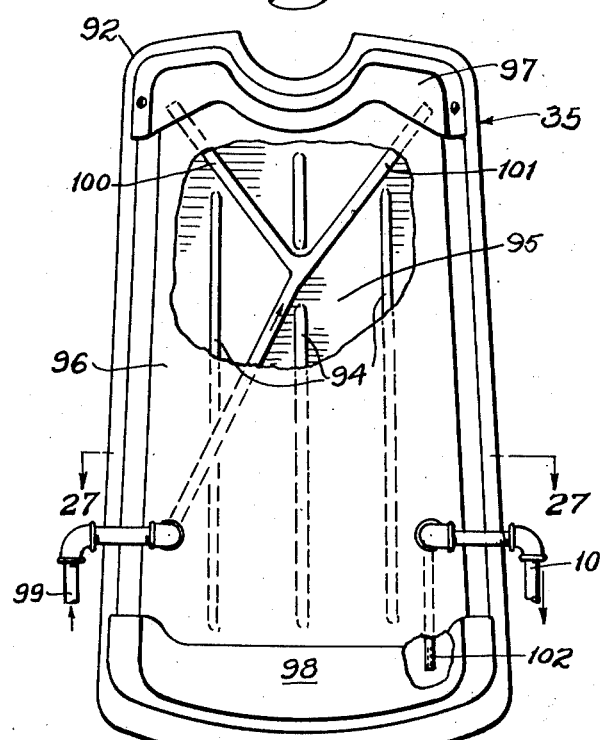
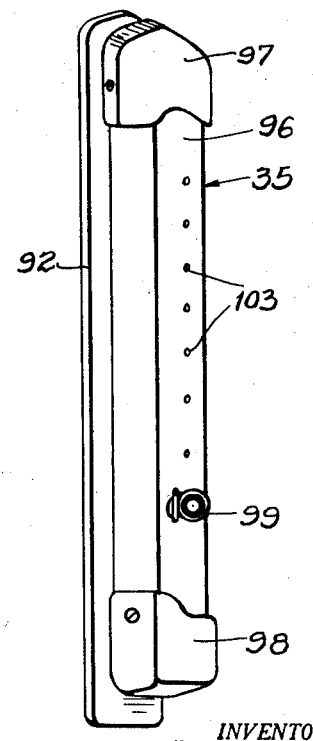
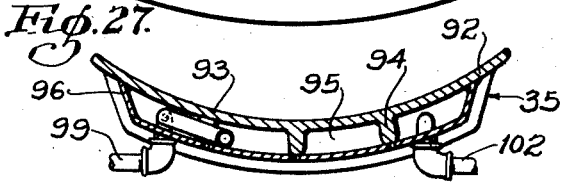
INVENTOR.
Otto H. Pearson
BY Carlos G. Stratton
ATTORNEY.

June 5, 1951  O. H. PEARSON  2,556,147
ROTATABLE BUCK RECIPROCATING HEAD PRESSING MACHINE
Filed April 2, 1945 7 Sheets-Sheet 7

INVENTOR.
Otto H. Pearson
BY Carlos G. Stratton
ATTORNEY.

Patented June 5, 1951

2,556,147

UNITED STATES PATENT OFFICE 2,556,147

ROTATABLE BUCK RECIPROCATING HEAD PRESSING MACHINE

Otto H. Pearson, Salt Lake City, Utah, assignor to Louis N. Strike, Salt Lake City, Utah Application April 2, 1945, Serial No. 586,053

4 Claims. (Cl. 38—22)

The present invention relates to pressing machines, and more particularly to a pressing machine that is especially adapted for pressing shirt bosoms, although the machine has other uses.

An important object of the invention is to provide a machine of the character mentioned that will vertically support a garment to be pressed, in order that it may hang by gravity to aid in removing wrinkles, and successively feed garments to a single pressing head.

Another object is to provide such a machine that will rotatably support a plurality of vertically mounted pressing bucks that are arranged for the operator to remove a garment from, and place another garment on, one buck, while another buck is having a garment pressed thereon.

A further object is to provide such a machine that is arranged for the operator to stand at one side thereof to run same, while the pressing is being done on the side away from the operator, to minimize the amount of heat to which the operator is subjected.

Still another object is to provide a self-centering pressing head to compensate for unevenness in manufacturing, in material being pressed, and in the padding on the buck.

Other objects are to provide clamping means to hold a part of the garment during pressing, and to automatically release same after pressing, and to provide in buck rotating means mechanism to withdraw steam through the padding on the bucks, thereby removing moisture from the garment through the padding.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

The following applications have been filed as divisions of this application: Ser. No. 715,687 (issued December 14, 1948, as Patent No. 2,456,-145), Ser. No. 715,688 (issued January 10, 1950, as Patent No. 2,493,997), and Ser. No. 715,689, now Patent No. 2,532,032, issued November 28, 1950.

In the drawings, like reference characters designate similar parts in the several views.

Fig. 1 is a side elevation of a machine embodying the foregoing features.

Fig. 2 is a perspective, rear view of a buck comprised in said embodiment.

Fig. 3 is a broken, perspective view of the upper portion of a pressing head element and associated collar clamping means.

Fig. 4 is a diagrammatic view of certain connections hereinafter more fully described.

Fig. 5 is a vertical, sectional view, with parts broken away, of said embodiment.

Fig. 6 is a rear, elevational view, partly in section and partly broken away, looking in the direction of the arrow 6 of Fig. 1.

Fig. 7 is a sectional view, taken on the line 7—7 of Fig. 6.

Fig. 8 is an enlarged, perspective view of control mechanism at the front of the machine.

Fig. 9 is a side elevation, partly in section and partly broken away, of the mechanism shown in Fig. 8.

Fig. 10 is a broken, horizontal section, taken on the line 10—10 of Fig. 9.

Fig. 11 is a sectional view, taken on the line 11—11 of Fig. 9.

Fig. 12 is an enlarged, elevational view of a collar clamp supporting and controlling mechanism at the top of said embodiment.

Fig. 13 is a horizontal, sectional view on the line 13—13 of Fig. 12.

Fig. 14 is a broken, sectional view, taken on the line 14—14 of Fig. 12.

Fig. 15 is an elevation, partly in section, looking in the direction of the arrow 15 of Fig. 12.

Fig. 16 is a transverse, sectional view, taken on the line 16—16 of Fig. 12.

Fig. 17 is a perspective view of a collar clamp pivoting member hereinafter more fully described.

Fig. 18 is an enlarged, vertical section, taken on the line 18—18 of Fig. 5.

Fig. 19 is a vertical, sectional view, taken on the offset line 19—19 of Fig. 18.

Fig. 20 is a transverse section taken on the line 20—20 of Fig. 19.

Fig. 21 is a perspective view of a control rod hereinafter more fully described.

Fig. 22 is an elevational view, looking in the direction of the arrow 22 of Fig. 1.

Fig. 23 is a vertical section, taken on the line 23—23 of Fig. 22.

Fig. 24 is a section, taken on the line 24—24 of Fig. 23.

Fig. 25 is a rear view of a pressing head comprised in the invention, shown partly broken away.

Fig. 26 is a side elevation of said pressing head.

Fig. 27 is a section, taken on the line 27—27 of Fig. 25.

Figure 28:
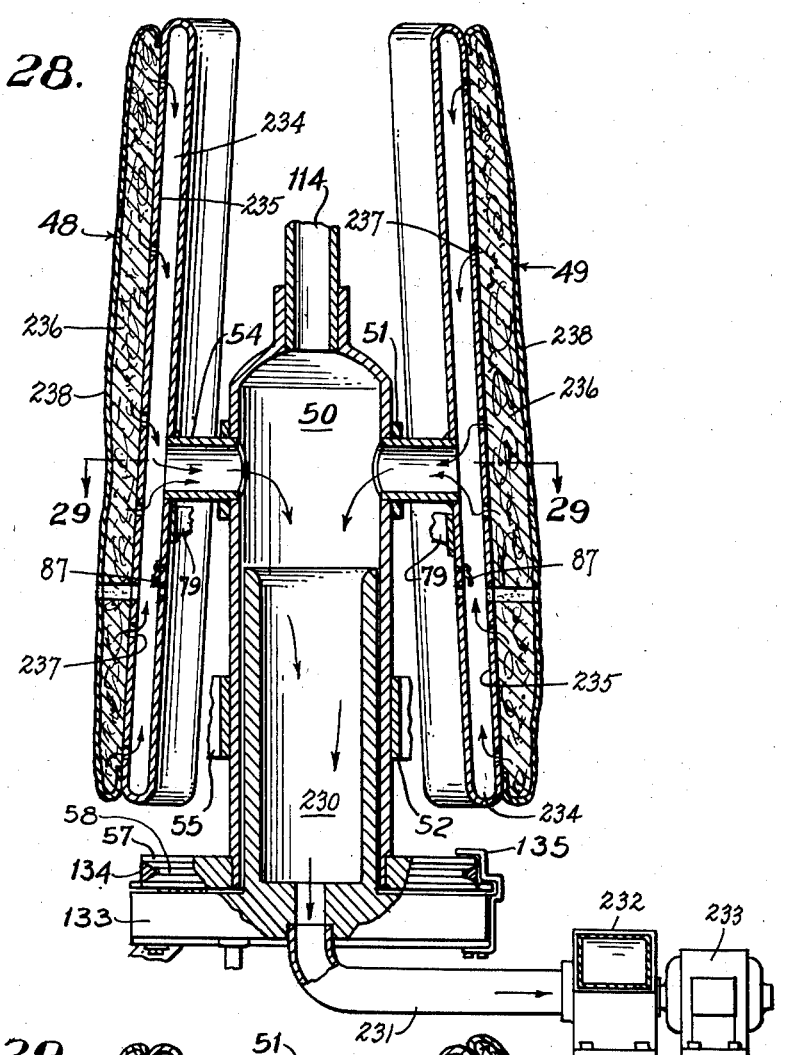
Fig. 28 is a vertical section through pressing bucks and steam exhausting means comprised in the invention.
Figure 29:
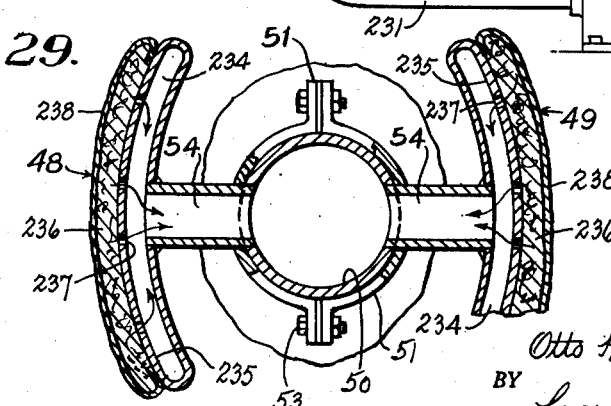
Fig. 29 is a broken transverse section taken on the line 29—29 of Fig. 28.

Referring more in detail to the drawings, the reference numbers 30 designate side members of a frame for the present pressing machine.

Flanged feet 31 may be bolted to the floor. The side members 30 have upwardly extending integral arm portions 32 that pivotally support a head actuating lever 33 fulcrumed at 34 on said arms.

A pressing head 35 is fed forwardly and rearwardly by the lever 33 through the intermediary of a link 36 mounted on a plate 37 that, in turn, carries the head 35 by means of bolts 38. The bolts 38 are loosely mounted in the plate 37, although a rounded portion 60 in the center area of the plate 37 bears directly upon an abutment 61 on the back of the head 35. Thus, pressure is transmitted directly from plate 37 to the pressing head 35 through the rounded portion 60. The floating connection of the four corners of the plate 37 permits substantially even pressure over the entire area of the pressing head and buck, since the rounded portion 60 permits the pressing head to tip or rock in order to conform to the opposed buck. Coil springs 39 are arranged between the heads of the bolts 38 and the plate 37, to yieldingly resist, but permit rocking movement of the head 35 relative to the plate 37.

The link 36 is pivotally connected with the lever 33 by a pin 40. In order to feed the head 35 forward in an upright position to the buck, a rod 41 is slidable in a lower pivoted shank 42 and is threadedly connected with an upper pivoted shank 43. A pin 44 pivots a sleeve 45 on the lower shank 42 upon the sides 30 of the frame, while a pin 46 pivots the upper shank member 43 on the link 36. The bottom of the socket in the shank 42 provides a limit for the downward swinging movement of the link 36, by means of rod 41, but the sliding relation of the rod 41 in the shank 42 permits upward swinging movement of the link 36 in order to effect the head 35 to press evenly against the buck over the entire pressing area of the head and buck. The rod may be adjusted by screwing in and out of the shank 43 and held in position by a lock nut 63. This adjustment of the rod 41 regulates the downward limit of the swinging movement of the link 36, since the bottom of the socket in the shank 42 is fixed.

Upright bucks 48 and 49 successively cooperate with the head 35. The bucks are preferably upright but not precisely vertical and, as perhaps best shown in Fig. 5 are mounted upon a rotating column 50 by means of rings 51 and 52, the complementary halves of which are bolted together, as suggested at 53. The complementary halves of the upper ring 51 have tubular supports 54 connecting the interiors of chests 234 at the rear of the bucks 48 and 49 with the interior of the hollow column 50. As shown in Fig. 28, a partition 235 separates the padded portion 236 of each buck 48 and 49 from the chests 234. Apertures 237 through the partitions 235 connect the interior of the padding 236 with the interior of the chests. The padding is shown covered with a porous fabric 238. The complementary halves of the lower ring 52 carry opposed plates 55 that support the lower ends of the bucks. Bolts 56 fasten flanges 64 to the backs of the bucks 48 and 49 (see Fig. 18).

Integral with the standard 50 at the bottom thereof is a circular base or flange 57 that is peripherally grooved at 58. A V-belt 134, shown in Fig. 9, may be used to engage and drive the base 57 by means of the circumferential groove 58 thereof. It will be understood by those skilled in the art that any suitable driving means (not shown) may be employed for driving the belt 134.

It will be noted, especially in Fig. 2, that coil springs 66 and 67 are employed to draw the padding 68 tight upon the bucks.

A tail clamp mechanism is employed in the present construction. Mounted on a plate 69, bolted to the back of each of the bucks 48 and 49, as best shown in Figs. 18 and 19, are ears 70, for pivotally supporting a toggle link 71 by means of a screw 72. Another toggle link 73 is pivotally mounted endwise with the link 71, as suggested at 74. A coil spring 75 around the toggle link 73 abuts against a shoulder member 76 and against a rotary pin 77, in which the link 73 slides as the toggle moves from one side to the other of dead center. The full lines in Fig. 19 show the toggle at one side of dead center, and the broken lines 78 show the toggle at the other side of dead center. The rotary pin 77 is pivotally mounted upon the lugs 79 on the plate 69. Slidable through a boss 80 on the plate 69 is a plunger 81 that carries a circumferentially grooved nut 82. The circumferential groove 83 in the nut 82 is engaged by screws 84, to permit rotation of the nut since the groove is engaged by the screws.

The opposite end of the plunger 81 has fixed thereon a shirt tail clamping blade 85. The plunger 81 is helically grooved at 86, as perhaps best shown in Fig. 21. A stationary finger 87 is mounted in an opening 88 in the padding on the bucks 48, 49. The finger 87 engaging the helical groove 86 causes longitudinal movement of the plunger 81 to be changed to spiral movement of the plunger. This spiral movement turns the clamping plate 85 from the full line position to the broken line position in Fig. 19 when the toggle goes from the full line position to the broken line position 78 in the same figure.

The normally lower end of the toggle link 71 has a roller 89 that engages the inner face of a fixed cam plate 90, as perhaps best shown in Fig. 20. As shown in said figure, the cam plate 90 causes the roller 89 to move the toggle over dead center during the rotation of the bucks on the frame, as the bucks return from the pressing head to the front of the machine. In use, the operator merely pushes the clamping plate 85 from the broken line position to the full line position, shown in Fig. 19, when the tail 91 of the shirt is smoothed down. This clamping plate 85 holds the shirt down firmly during pressing.

The pressing head 35 is shown comprising a grooved pressing plate 92 provided with a smooth pressing surface 93. As shown in Fig. 25, strengthening and spacing ribs 94 on the back of the plate 92 provide channels 95 therebetween and space a rear plate 96 from the pressing plate, to provide a steam space. Top and bottom headers 97 and 98 hold the rear plate 96 in position and provide steam-tight closures at the ends of the plate 96.

A steam inlet conduit 99 has branches 100 and 101 in Y formation, the top of which extend near the top of the space inside the pressing head 35. The bottom header 98 provides a sump interiorly for the reception of products of condensation, which are withdrawn by a conduit 102 that extends near the bottom thereof. Due to the movability of the pressing head 35, it is necessary that the conduits 99 and 102 be flexible. Spot welds 103 are employed to fasten the rear plate 96 to the spacing ribs 94.

A form 104 is shown in detail in Figs. 22 and 23, for the collar of a shirt. A resilient band 105 is bolted at its ends to the form 104, as shown at 106. A cushion 107 at the side of the form 104 is arranged behind the band 105 to yieldingly mount the band. A hook 108 hangs outwardly from the form 104. Suitable fastening means 109 pin the inner end of the hook 108 to the form 104, while the outer, hanging end has lateral ears 110 under which the tabs of a shirt collar are tucked when the collar is turned up during pressing, as shown in Fig. 12. Bolts 111 support the form 104 from back-plates 112, which, in turn, are bolted as shown at 113, to the bucks 48 and 49 respectively.

A standard 114 is mounted upon and rotates with the column 50. The standard 114 has lateral pins 115 projecting laterally from the standard. A bearing 116 carries rocking arms 117. A bushing 118 is arranged in the bearing 116, as shown in Fig. 12. Pivotally mounted on pins 119 in knuckles 117a at the outer ends of the arms 117, are brackets 120 that carry resilient collar clamping bands 121, the collar tab being suggested at 122 in Fig. 12. A plate 123 connects the pair of brackets 120 for conjunctive movement.

Handles 124 are bolted to the top of the plates 123 respectively, as perhaps best shown at 125 in Fig. 15. The handles are for the manual operation of the clamping bands 121. Lever arms 126 on one handle 124 are connected by pivots 226 with corresponding lever arms on the other handle 124 by means of connecting rods 127. With the pins 119 as fulcrums, when one handle 124 is rocked so that the band 121 assumes a clamping position around the collar, the opposite collar clamp 121 is raised, through the intermediary of the connecting rods 127 and the lever arms 126 on the other handle 124.

The handles 124 also have lugs 128, shown in Fig. 15, for connecting with coil springs 129, which springs, in turn, are hooked around set screws 130, projecting laterally from a band 131, as shown enlarged in Fig. 16. The set screws are also useful in adjusting the band 131 vertically on the standard 114.

The base 57 is rotatably supported on ball bearings 132 in a race 142 provided by the underside of the base 57 and a relatively stationary supporting table 133, which is mounted on the frame 30. The V-shaped driving belt for engaging the groove 58 is shown at 134. A C-clamp 135 is bolted to the underside of the fixed table 133, as suggested at 136, and extends over the top of the rotary base 57 and supports a gib key 137 contacting the top of the rotary base 57.

Depending from the stationary table 133, is a plurality of brackets 138, 139 and 140. In Fig. 8 there are shown two brackets numbered 139, which together support a rotary pin 143. The bracket 138 pivotally supports at 144 a link 145 of a toggle. The other link of the toggle is shown at 146, which latter link is longitudinally slidable in the rotary pin 143. A coil spring 148 snaps the toggle one way or the other from dead center. A tapered reciprocating locking member 149 is movable into and out of a correspondingly shaped recess 150 in the rotary base 57, to lock the rotary bucks in a position for changing the garment on one buck and for pressing the garment on the other buck.

The toggle 145, 146, controls the locking member 149. A pin 151 pivotally connects the toggle link 145 with the locking member 149. When the toggle 145, 146 snaps below dead center, the locking member 149 is moved out of locking position, as shown in Fig. 9, and when the toggle 145, 146 snaps above dead center position, the spring 148 tends to move the locking member into engagement with the opening 150.

Depending from the locking member 149 is a rod 152 that has an abutment collar 153 with a spring cushion 154 thereunder. An arm 155 on the actuating mechanism, hereinafter more fully described, withdraws the locking member 149 from the recess 150 at a predetermined point in the operation of the mechanism, the spring 154 providing a means to cushion the contact of the arm 155 with the abutment collar 153. The outer end 156 of the arm 155 is slotted, as shown at 157. The rod has a pivotal connection 158 with the locking member 149. A pin 159 closes the end of the slot 157 to prevent the escape of the rod 152 therefrom.

An upstanding finger 160 on the outer end of the link 145 rotatably supports an abutment roller 161. The roller 161 rides on the corner 162 of the relatively stationary table 133 during most of the rotation of the rotary base 57. Cam projections 163 on opposite parts of the rotary base 57 engage the roller 161 in the rotation of the base and move the roller to its broken line position in Fig. 9, which breaks the toggle and pushes the toggle over dead center, to move the locking member 149 into its locking opening 150. There are two cams 163, so as to lock the rotary mechanism each half turn, when one or the other of the rotary bucks is at the front of the machine and the other is opposite the pressing head. During the time that base 57 is locked, belt 134 slips in the groove 58 of said base.

Extending downward from the outer end of the link 145 is an integral arm 164 that carries an adjustable spring stop pin 165, as best shown in Fig. 11. The pin 165 has a reduced shank 166 around which is coiled a spring 167. The spring is housed in a cap 168 that has hexagonal heads, as shown in Figs. 8 and 9. The pin 165 slides in a sleeve 169 on the arm 164. A disk 170 shrunk in the cap 168 closes the outer end thereof. The shoulder 171 provided by the reduced end 166 affords an abutment for the spring 167, which has a cushioning effect upon the pin 165.

The pin 165 is movable by the arm 164 to and from a position engaging an operating shank 172 on a valve 173, hereinafter more fully described.

The actuating mechanism for the machine comprises a prime mover 174 which consists of a piston 176 and cylinder 175. The cylinder 175 is mounted to rock upon a ball and socket connection 177, which connection, in turn, is mounted on a platform 178 fixed between the side plates 30 on the frame of the machine. The piston rod 179 on the piston 176 carries a coil spring 180 that tends to move the piston rod 179 out of the cylinder 175.

Roller bearing means 181, on the outer end of the piston rod 179, ride on a fixed track 182, 183. The portion 182 of the track is for the more rapid movement of the pressing head toward a closing position, while the track 183 is for the slower, more powerful, final closing motion.

A toggle is arranged to operate the pressing head lever 33, consisting of links 184 and 185, pivoted together at 186. Floating bearings 187 journal the pivot 186, while floating bearing 188 journals the lower end of the link 185 to the toggle joint. The upper end of the link 185 is rotatably mounted on a stub shaft 189 on lever 33.

The hereinbefore mentioned arm 155 is an integral elongation of the toggle 184, which is mounted to rock on the shaft 195 on the frame of the machine.

The link 184 has a lug 196 that is connected with a rod 197, which, in turn, is connected with a lever 198 on a cushioning or dashpot check device, shown in Fig. 7. Said device comprises a cylindrical housing 199. The housing 199 pivotally supports the end of lever 198, by means of the shaft 200. The lever 198 is keyed to the shaft. A crank arm 201 also fixed on the shaft 200, has a rounded end 202 fitting in a recess 203 in a reciprocating barrel 204. Screws 205 and 206 may be adjusted to control the amount and rate of flow of liquid into and out of the barrel 204. It is believed clear that a body of liquid is contained in the housing 199. The restrictions to the passage of the liquid into and out of the barrel cause the cushioning effect of the present dashpot device.

A pair of large return springs 210 is employed to move the pressing head 35 to open position. Valve 173 has a tubular connection 212 leading to the control mechanism for the main driving cylinder 175. Said control mechanism may be such as the diaphragm chamber 57, shown in Pearson, et al., Patent No. 2,207,468, issued July 9, 1940. The present actuating mechanism is similar to that shown in Gates, et al., Patent No. 2,269,308, issued January 6, 1942, to which reference is made for a more detailed explanation of the present actuating mechanism. Two other connections with the valve 173 are shown at 213 and 214, which respectively connect with a release valve 220 of any suitable construction, and with a source of compressed air (not shown) such as an air compressor or tank of compressed air. A plunger 215 in the valve 173 may be balanced by springs 216 and 217 at opposite sides thereof. The plunger normally closes the passage of air from the source of compressed air to the prime mover control conduit 212, as shown in Fig. 11. The actuating mechanism per se forms no part of the present invention, so further detailed illustration and explanation are not believed necessary, and especially the pneumatic system for controlling the said mechanism, since a suitable pneumatic system is shown and described in detail in said Pearson patent.

As best shown in Fig. 28, the stationary base 133 has an upstanding trunnion 230, around which the column 50 and base 57 rotate in snug relationship. The hollow interior of the trunnion 230, at its lower end, connects with a conduit 231, through which steam-laden air is exhausted by means of a blower 232 driven by a motor 233.

Operation

In the operation of the present machine, the operator places a shirt to be pressed on the buck that is at the front of the machine (at the left in Fig. 1). The collar of the shirt is turned up with the tabs of the collar caught under the ears 110 of the hook member 108, as best shown in Fig. 12. Then the clamping band 121 is lowered around the collar, to hold it in position, by means of the handle 124. The springs 129 tend to swing the rocker arm 117 about its pivot 115, which movement clamps the band 121 tight around the collar. Lowering movement of one clamping band 121 causes the other clamping band 121 to be raised up from its position on the other buck. The connecting rods effect this corresponding operation.

The shirt is smoothed down upon the buck and the tail clamp 85 is pushed inward toward the buck. When the toggle links 71 and 73 have snapped over dead center, the spring 75 tends to draw the clamp 85 tight against the shirt, to hold same firm during pressing. The plate 85 turns from an upright position, which provides the least obstruction, while the shirt is being placed on the buck, to a crosswise position, in order to provide a maximum clamping width.

When the buck has reached the position opposite the pressing head 35, the prime mover is actuated by suitable means to cause the lever 33 to swing about to shaft 34. By the mechanism described, the head moves forward toward the opposed buck in a generally upright position. That is, the pressing head 35 does not swing in an arc along with the lever 33. The rod 41 and its associated shanks prevent the swinging movement of the pressing head. The mounting of the head 35 upon the plate 37 hereinbefore described, permits the head to conform to the shape and thickness of the padding on the two bucks from the time the padding is first placed thereon until considerably flattened near the end of its useful life.

Steam is admitted to the pressing head 35 through the conduit 99 when the head is in a pressing position.

The heat that is thereby applied to a moist garment on an opposed buck causes the emission of steam from the garment. This steam is drawn through the porous fabric covering 238 of the buck, through the padding 236, through the apertures 237, through the chest 234, through the tubular supports 54, through the column 50, through the hollow trunnion 230, through conduit 231, and discharged by the blower 232 into the atmosphere. Of course the same operation takes place irrespective of which buck is opposite the pressing head.

During the rotation of the buck from a position opposite the pressing head at the front of the machine, the roller 89 rides on the cam plate 90, thus releasing the shirt tail clamp 85 from the shirt, so the shirt will be ready to be removed from the buck when it returns to the front of the machine, the collar clamping band 121 having been lifted while the shirt was being pressed on the other buck.

When one of the cams 163 engages the roller 161, the roller is moved outwardly to the broken line position shown in Fig. 9, thereby tilting the toggle link 145 downwardly about its fulcrum and moving the toggle connection upwardly over dead center. This operation: (1) causes the locking member 149 to enter one of the recesses 150 in the rotary base 57, thus locking the base against rotation; (2) during the downward movement of the link 145, the pin 165 on the arm 164 of said link, engages the valve stem 172 and thereby moves the plunger 215 to the right in Fig. 11, thus uncovering the connection between the conduits 214 and 212 through the valve 173, which actuates the prime mover to move the pressing head 35 to a pressing position. This operation provides a safety factor, as it will be noted that the air is not supplied to the prime mover until and unless the rotary base (and thereby the rotary bucks) are locked against rotation.

The arrangement of the springs 129 will be noted in Fig. 12. When the axis of the springs extends thru the axis of the pins 226, that is dead center in the movement of the springs. The springs 129 snap to the right or left (as shown in Fig. 12) of that dead center. The springs thereby tend to hold the clamping collars to whatever position they are moved.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In a garment pressing machine, a support frame, a plurality of pressing bucks, mechanism rotatably mounted on said frame and supporting the bucks and arranged to carry the same in an endless path, actuators carried by said mechanism and movable with the bucks, locking means for said mechanism connected to the frame and embodying over-center, snap-acting spring means normally retaining the locking means in non-locking position, a pressing head, prime mover means carried by the frame and connected to move the pressing head to and from the path defined by the bucks, a normally closed valve having fluid connection with the prime mover to control the latter, said actuators, when a buck is opposite the pressing head, tripping the over-center means to move the locking means to lock said mechanism and the bucks thereon, a member moved by the actuators to engage and open said valve subsequent to the said movement of the locking means to cause the prime mover to move the pressing head into pressing engagement with the buck opposite thereto, a member carried by the frame and moved by the prime mover to engage and move the over-center means to restore the same to initial position to simultaneously unlock said mechanism and release said valve to close after the head has achieved pressing position, means automatically returning the head to non-pressing position while said valve is closed, and means for moving the buck-supporting mechanism to move the next buck into pressing position.

2. In a garment pressing machine, a support frame, a plurality of pressing bucks, mechanism rotatably mounted on said frame and supporting the bucks and arranged to carry the same in an endless path, actuators carried by said mechanism and movable with the bucks, locking means for said mechanism connected to the frame and embodying over-center, snap-acting spring means normally retaining the locking means in non-locking position, said latter means including a pivoted member having a roller at one end and a locking bolt connected to the other end, said actuators comprising cam lugs mounted on the periphery of the buck-supporting mechanism and movable with said mechanism to move the roller and thereby the locking bolt to locking position, a pressing head, prime mover means carried by the frame and connected to move the pressing head to and from the path defined by the bucks, a normally closed valve having fluid connection with the prime mover to control the latter, said actuators, when a buck is opposite the pressing head, tripping the over-center means to move the locking means to lock said mechanism and the bucks thereon, a member moved by the actuators to engage and open said valve subsequent to the said movement of the locking means to cause the prime mover to move the pressing head into pressing engagement with the buck opposite thereto, a member carried by the frame and moved by the prime mover to engage and move the over-center means to restore the same to initial position to simultaneously unlock said mechanism and release said valve to close after the head has achieved pressing position, means automatically returning the head to non-pressing position while said valve is closed, and means for moving the buck-supporting mechanism to move the next buck into pressing position.

3. In a garment pressing machine, in combination, a pressing head, a plurality of pressing bucks, a rotating support mounting said bucks for movement in a circular path relative to said head to sequentially position the bucks in operative association with the head, indexing mechanism for effecting the mentioned movement of the support and bucks, a fixed frame mounting the rotating support and the head, locking means carried by said frame and actuated by the rotating support to lock the latter to the frame when a buck achieves an operative position relative to the head, fluid-operated means including a prime mover to move the head into pressing engagement with the buck operatively associated therewith, and a normally closed valve mounted on said frame and actuated by said locking means to control admission of fluid pressure to said prime mover, whereby when said locking means is actuated to lock said rotating support, said valve is simultaneously opened to admit pressure fluid to said prime mover.

4. The combination according to claim 3: a lever pivoted to said frame, one end of said lever being attached to said prime mover, the other end of said lever being engageable with said locking means, whereby said locking means is withdrawn and simultaneously said valve is released when said prime mover is actuated, and means for the storing said prime mover to its initial position when said valve is released, thereby retracting said head to a non-pressing position.

OTTO H. PEARSON.

REFERENCES CITED

The following references are of record in the file of this patent:

UNITED STATES PATENTS

| Number | Name | Date |
|---|---|---|
| 211,966 | Butterworth | Feb. 4, 1879 |
| 1,069,232 | Cooper | Aug. 5, 1913 |
| 1,131,493 | Dunbar et al. | Mar. 9, 1915 |
| 1,195,553 | Binder | Aug. 22, 1916 |
| 1,233,305 | Braley | July 17, 1917 |
| 1,536,235 | Miller | May 5, 1925 |
| 1,549,069 | Dienner | Aug. 11, 1925 |
| 1,556,625 | Pomeroy | Oct. 13, 1925 |
| 1,602,970 | Fiskow | Oct. 12, 1926 |
| 1,625,116 | Fish | Apr. 19, 1927 |
| 1,698,954 | Lindy | Jan. 15, 1929 |
| 1,710,263 | Kienzle | Apr. 23, 1929 |
| 1,743,256 | Waream | Jan. 14, 1930 |

(Other references on following page)

UNITED STATES PATENTS

| Number | Name | Date |
|---|---|---|
| 1,766,187 | Pauly | June 24, 1930 |
| 1,802,018 | Holttum | Apr. 21, 1931 |
| 1,893,190 | West | Jan. 3, 1933 |
| 1,900,720 | Lindemann | Mar. 7, 1933 |
| 1,900,748 | Wilhelm | Mar. 7, 1933 |
| 1,940,642 | Davis | Dec. 19, 1933 |
| 1,963,038 | Vargo | June 12, 1934 |
| 1,967,023 | Davis | July 17, 1934 |
| 1,986,099 | Beede | Jan. 1, 1935 |
| 1,997,230 | Otis et al. | Apr. 9, 1935 |
| 2,023,896 | Matthews | Dec. 10, 1935 |
| 2,037,550 | Visscher | Apr. 14, 1936 |
| 2,126,577 | Rawlinson | Aug. 9, 1938 |
| 2,127,520 | Kahn | Aug. 23, 1938 |
| 2,202,483 | Dewey | May 28, 1940 |
| 2,209,858 | Steiert | July 30, 1940 |
| 2,241,373 | Rawlinson et al. | May 6, 1941 |
| 2,246,157 | Wolff | June 17, 1941 |
| 2,254,653 | Hech | Sept. 2, 1941 |
| 2,280,288 | Forse | Apr. 21, 1942 |
| 2,301,766 | Williams et al. | Nov. 10, 1942 |
| 2,365,448 | Bicknell et al. | Dec. 19, 1944 |